(12) United States Patent
Katz et al.

US011062697B2

(10) Patent No.: US 11,062,697 B2
(45) Date of Patent: Jul. 13, 2021

(54) SPEECH-TO-TEXT TRAINING DATA BASED ON INTERACTIVE RESPONSE DATA

(71) Applicant: International Business Machines Corporation, Armonk, NY (US)

(72) Inventors: Edward G. Katz, Washington, DC (US); Alexander C. Tonetti, Washington, DC (US); John A. Riendeau, Madison, WI (US); Sean T. Thatcher, Stone Ridge, VA (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 16/173,916

(22) Filed: Oct. 29, 2018

(65) Prior Publication Data

US 2020/0135175 A1    Apr. 30, 2020

(51) Int. Cl.
*G10L 15/06* (2013.01)
*G10L 15/30* (2013.01)
*G10L 15/18* (2013.01)

(52) U.S. Cl.
CPC ........ *G10L 15/063* (2013.01); *G10L 15/1815* (2013.01); *G10L 15/30* (2013.01); *G10L 2015/0635* (2013.01)

(58) Field of Classification Search
CPC ... G10L 15/00; G10L 15/063; G10L 15/1815; G10L 15/30; G10L 2015/0635
USPC ...................................................... 704/235
See application file for complete search history.

(56) References Cited

U.S. PATENT DOCUMENTS

| 2010/0228540 | A1 | 9/2010 | Bennett | |
| 2011/0054896 | A1* | 3/2011 | Phillips | G10L 15/30 704/235 |
| 2012/0008754 | A1* | 1/2012 | Mukherjee | G10L 15/22 379/88.18 |
| 2013/0138439 | A1* | 5/2013 | Marcus | G10L 15/22 704/240 |

(Continued)

OTHER PUBLICATIONS

Abushawar, Bryan , et al., "Automatic Extraction of Chatbot Training Data from Natural Dialogue Corpora", 2016, 10 pages.

(Continued)

*Primary Examiner* — Michael Colucci
(74) *Attorney, Agent, or Firm* — Michael A. Petrocelli

(57) ABSTRACT

A device includes a processor configured to, in response to determining that an input phrase includes a first term that is included in a term hierarchy, generate a second phrase by replacing the first term in the input phrase with a second term included in the term hierarchy. The processor is configured to determine that interactive response (IR) training data indicates that the input phrase is associated with a user intent indicator. The processor is configured to determine that user interaction data indicates that a first proportion of user phrases received by an IR system correspond to the user intent indicator. The processor is configured to update speech-to-text training data based on the input phrase and the second phrase so that a second proportion of training phrases of the speech-to-text training data correspond to the user intent indicator. The second proportion is based on the first proportion. A speech-to-text model is trained based on the speech-to-text training data.

20 Claims, 8 Drawing Sheets

(56) References Cited

U.S. PATENT DOCUMENTS

| | | | |
|---|---|---|---|
| 2014/0088971 A1* | 3/2014 | Metcalf | H04M 3/4931 704/270.1 |
| 2014/0180671 A1* | 6/2014 | Osipova | G06F 9/454 704/8 |
| 2016/0117593 A1 | 4/2016 | London | |
| 2017/0017635 A1 | 1/2017 | Leliwa et al. | |
| 2017/0256256 A1* | 9/2017 | Wang | G10L 15/26 |
| 2018/0182386 A1* | 6/2018 | Lee | G10L 15/14 |
| 2018/0227418 A1* | 8/2018 | Segalis | G06F 40/20 |
| 2018/0358001 A1* | 12/2018 | Amid | G06N 20/00 |
| 2019/0103095 A1* | 4/2019 | Singaraju | H04L 51/04 |
| 2020/0090034 A1* | 3/2020 | Ramachandran | G10L 15/16 |

OTHER PUBLICATIONS

Hu, Fanghuai, et al., "Self-Supervised Synonym Extraction from the Web", Journal of Information Science and Engineering 31, 1133-1148, 2015, 16 pages.

Mell, Peter, et al., "The NIST Definition of Cloud Computing; Recommendations of the National Institute of Standards and Technology", NIST Special Publication 800-145; Computer Security Division, Information Technology Laboratory, National Institute of Standards and Technology, U.S. Department of Commerce, Sep. 2011, 7 pages.

* cited by examiner

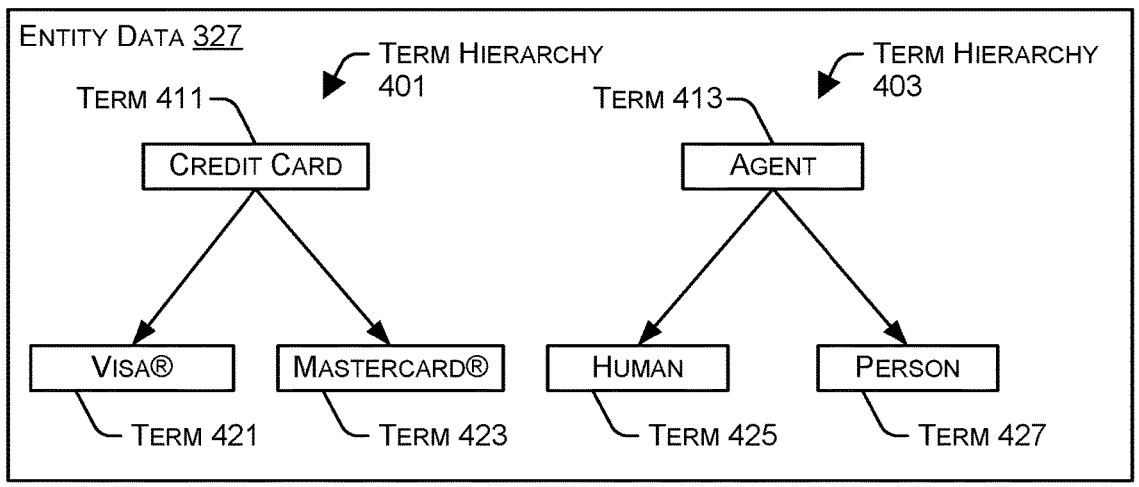
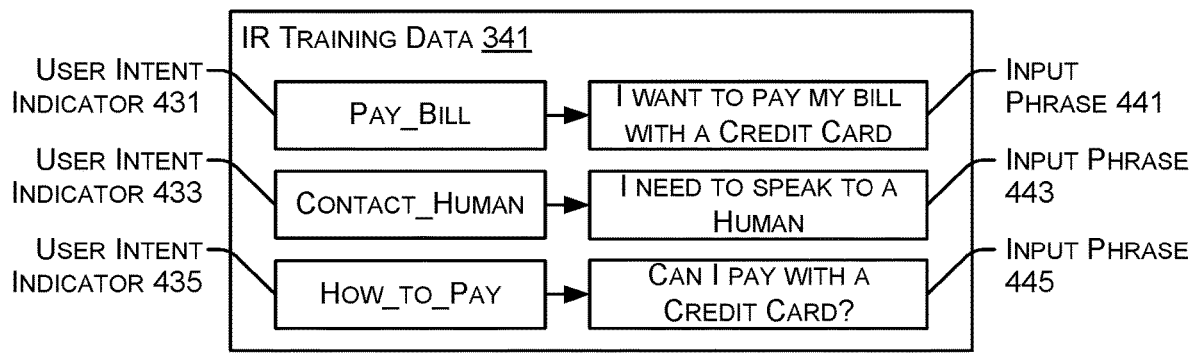
FIG. 4

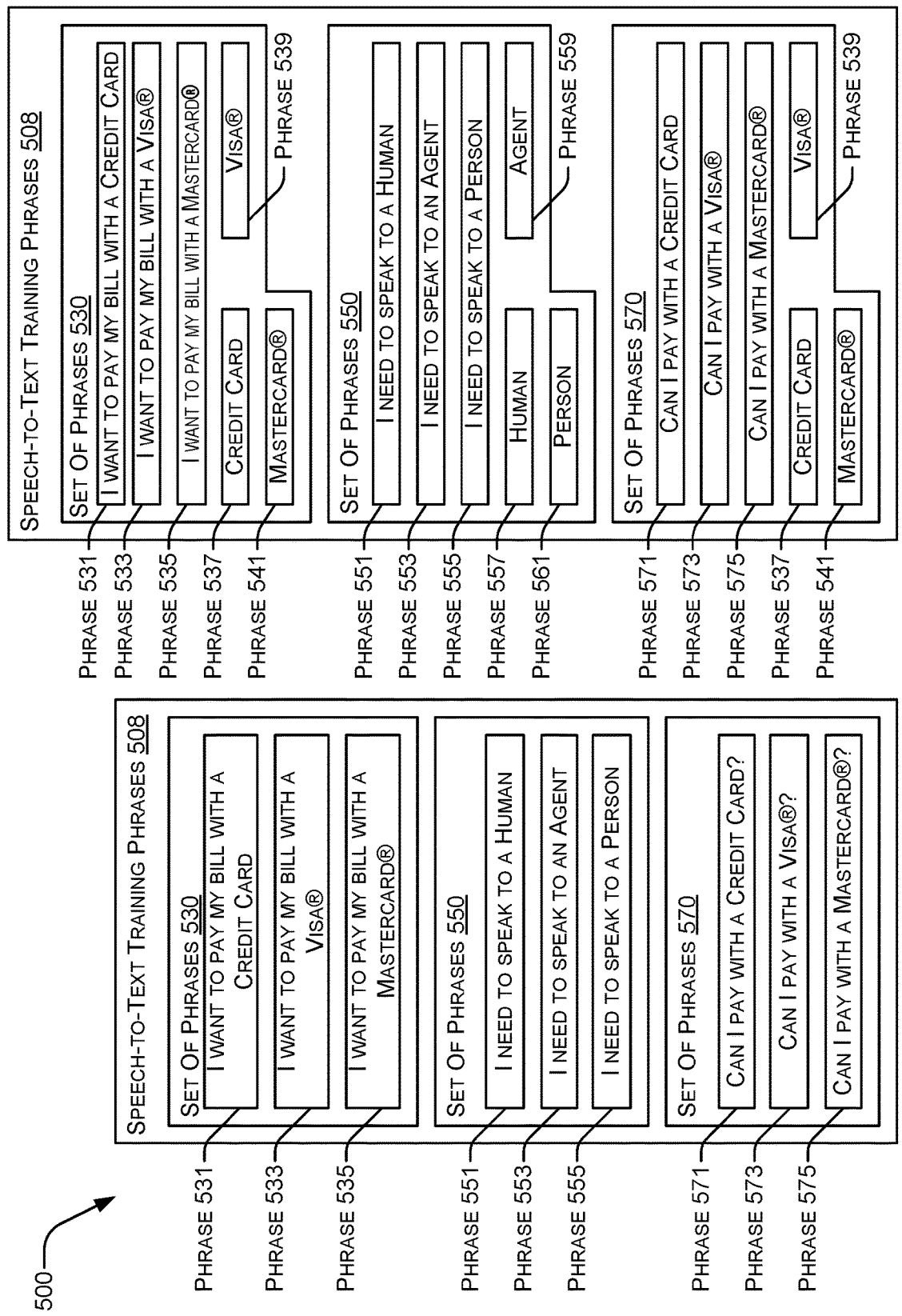

SPEECH-TO-TEXT TRAINING DATA 321

| Label | Phrase |
|---|---|
| PHRASE 531 | I WANT TO PAY MY BILL WITH A CREDIT CARD |
| PHRASE 533 | I WANT TO PAY MY BILL WITH A VISA® |
| PHRASE 535 | I WANT TO PAY MY BILL WITH A MASTERCARD® |
| PHRASE 537 | CREDIT CARD |
| PHRASE 539 | VISA® |
| PHRASE 541 | MASTERCARD® |
| PHRASE 531 | I WANT TO PAY MY BILL WITH A CREDIT CARD |
| PHRASE 539 | VISA® |
| PHRASE 551 | I NEED TO SPEAK TO A HUMAN — HUMAN (PHRASE 557) |
| PHRASE 553 | I NEED TO SPEAK TO AN AGENT — AGENT (PHRASE 559) |
| PHRASE 555 | I NEED TO SPEAK TO A PERSON — PERSON (PHRASE 561) |
| PHRASE 557 | HUMAN — I NEED TO SPEAK TO A HUMAN (PHRASE 551) |
| PHRASE 559 | AGENT — I NEED TO SPEAK TO AN AGENT (PHRASE 553) |
| PHRASE 561 | PERSON — I NEED TO SPEAK TO A PERSON (PHRASE 555) |
| PHRASE 551 | I NEED TO SPEAK TO A HUMAN — AGENT (PHRASE 559) |
| PHRASE 553 | I NEED TO SPEAK TO AN AGENT — PERSON (PHRASE 561) |
| PHRASE 571 | CAN I PAY WITH A CREDIT CARD |
| PHRASE 573 | CAN I PAY WITH A VISA® |
| PHRASE 575 | CAN I PAY WITH A MASTERCARD® |
| PHRASE 537 | CREDIT CARD |
| PHRASE 539 | VISA® |
| PHRASE 541 | MASTERCARD® |
| PHRASE 575 | CAN I PAY WITH A MASTERCARD® |
| PHRASE 541 | MASTERCARD® |

FIG. 6

SPEECH-TO-TEXT TRAINING DATA BASED ON INTERACTIVE RESPONSE DATA

I. BACKGROUND

The present application relates to using interactive response training data to generate (or update) speech-to-text training data.

II. SUMMARY

In a particular implementation, a device includes a memory and a processor. The memory is configured to store speech-to-text training data. The processor is configured to access interactive response (IR) training data of an IR system. The IR training data associates input phrases supported by the IR system to user intent indicators. The processor is also configured to, in response to determining that a first input phrase of the input phrases includes a first term that is included in a term hierarchy, generate a second phrase by replacing the first term in the first input phrase with a second term included in the term hierarchy. The processor is further configured to determine that the IR training data indicates that the first input phrase is associated with a first user intent indicator. The processor is also configured to determine that user interaction data indicates that a first proportion of user phrases received by the IR system from users corresponds to the first user intent indicator. The processor is further configured to update the speech-to-text training data based on the first input phrase and the second phrase so that a second proportion of training phrases of the speech-to-text training data corresponds to the first user intent indicator. The second proportion is based on the first proportion. A speech-to-text model is trained based on the speech-to-text training data.

In another particular implementation, a method includes accessing, at a device, interactive response (IR) training data of an IR system. The IR training data associates input phrases supported by the IR system to user intent indicators. The method also includes determining, at the device, that a first input phrase of the input phrases includes a first term that is included in a term hierarchy. The method further includes, in response to determining that the first input phrase includes the first term, generating a second phrase by replacing the first term in the first input phrase with a second term included in the term hierarchy. The method also includes determining, at the device, that the IR training data indicates that the first input phrase is associated with a first user intent indicator. The method further includes determining, at the device, that user interaction data indicates that a first proportion of user phrases received by the IR system from users corresponds to the first user intent indicator. The method also includes updating, at the device, speech-to-text training data based on the first input phrase and the second phrase so that a second proportion of training phrases of the speech-to-text training data corresponds to the first user intent indicator. The second proportion is based on the first proportion. A speech-to-text model is trained based on the speech-to-text training data.

In another particular implementation, a computer program product includes a computer readable storage medium having program instructions embodied therewith. The program instructions are executable by a processor to cause the processor to perform operations including accessing interactive response (IR) training data of an IR system. The IR training data associates input phrases supported by the IR system to user intent indicators. The operations also include determining that a first input phrase of the input phrases includes a first term that is included in a term hierarchy. The operations further include, in response to determining that the first input phrase includes the first term, generating a second phrase by replacing the first term in the first input phrase with a second term included in the term hierarchy. The operations also include determining that the IR training data indicates that the first input phrase is associated with a first user intent indicator. The operations further include determining that user interaction data indicates that a first proportion of user phrases received by the IR system from users corresponds to the first user intent indicator. The operations also include updating speech-to-text training data based on the first input phrase and the second phrase so that a second proportion of training phrases of the speech-to-text training data corresponds to the first user intent indicator. The second proportion is based on the first proportion. A speech-to-text model is trained based on the speech-to-text training data.

III. BRIEF DESCRIPTION OF THE DRAWINGS

FIG. 4 illustrates examples of entity data, IR training data, and distribution data used by the system of FIG. 3 to generate speech-to-text training data.

FIG. 5A illustrates examples of speech-to-text training phrases generated by the system of FIG. 3.

FIG. 5B illustrates additional examples of speech-to-text training phrases generated by the system of FIG. 3.

FIG. 6 illustrates additional examples of speech-to-text training data generated by the system of FIG. 3.

IV. DETAILED DESCRIPTION

Figure 1:
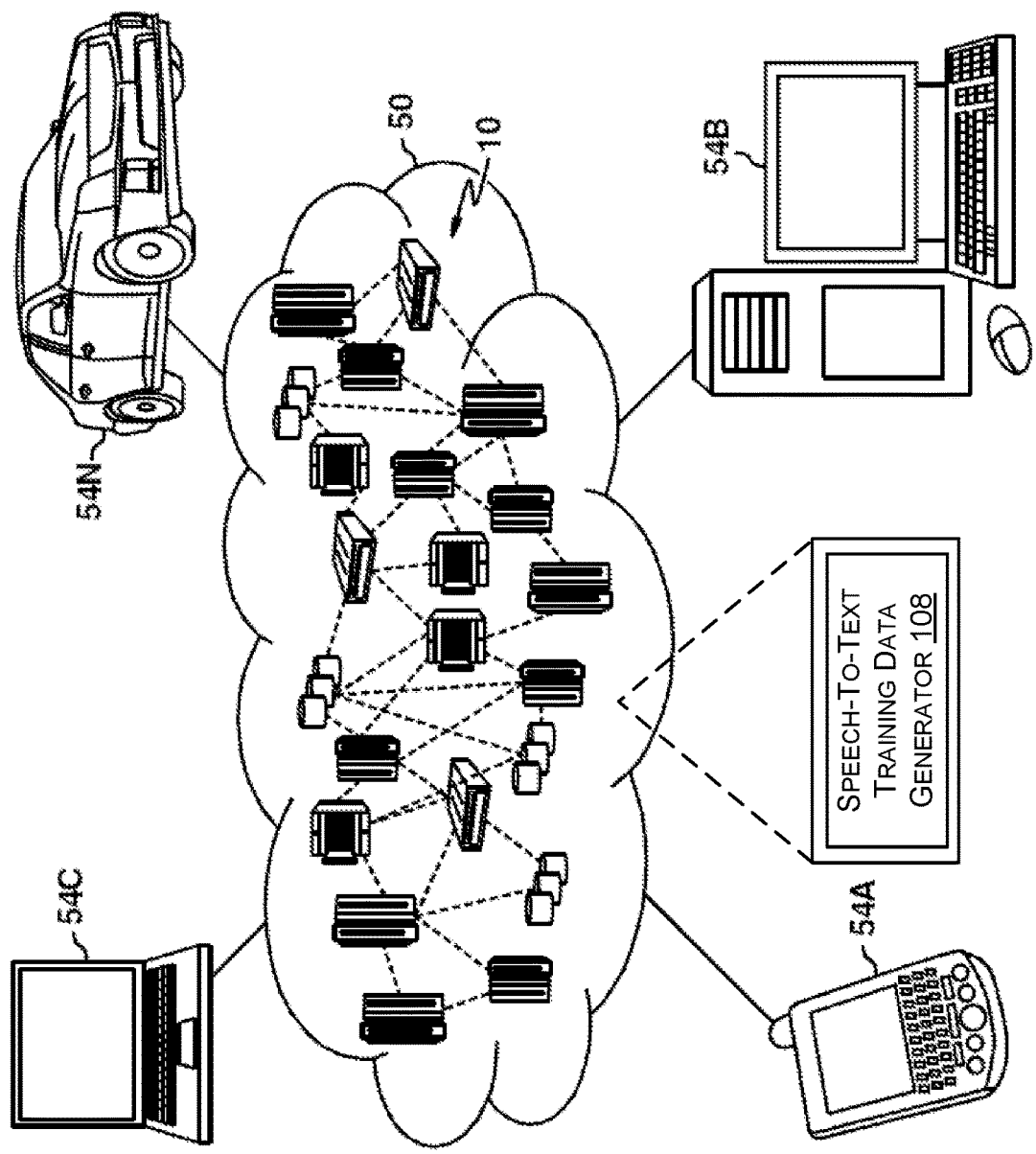
FIG. 1 illustrates a cloud computing environment according to an aspect of the disclosure.

Systems and methods of speech-to-text training data generation are disclosed. Speech recognition systems recognize and translate speech into text. Speech recognition systems are useful in a broad range of applications, such as in-car systems, home automation, interactive voice response systems, etc. Errors in speech recognition can lead to user frustration and higher costs. For example, a user calls a speech recognition system to pay a bill. If the speech recognition system is unable to accurately recognize the speech of the user, the user can get frustrated and prefer to speak to a human operator. Employing human operators for customer service increases operating costs for a business. A speech recognition system can be trained to more accurately recognize speech in specific contexts. For example, training data for an interactive text response system (e.g., a chatbot) maps user phrases (e.g., text phrases) to user intent indicators for a particular context (e.g., a clothes store context). To illustrate, an online shopping application associated with the particular context (e.g., the clothes store context) displays a graphical user interface (GUI) on a mobile device of a user. The user can enter phrases (e.g., "I'd like to pay with a credit card") via the GUI. A text-based chatbot (e.g., a computer program that conducts a conversation) generates a response (e.g., "What is your credit card number?") based on the training data and the phrase received from the user. For example, the text-based chatbot determines that the training data indicates that the phrase (e.g., "I'd like to pay with a credit card") maps to a user intent indicator (e.g., a pay_bill indicator). The text-based chatbot generates the response (e.g., "What is your credit card number?") in response to determining that the phrase (e.g., "I'd like to pay with a credit card") maps to the user intent indicator (e.g., the pay_bill indicator). The text-based chatbot outputs the response via the GUI. The text-based chatbot thus interacts with the user in the particular context (e.g., the clothes store context).

The training data of the text-based chatbot (e.g., the interactive text response system) can be used to train a speech recognition system (e.g., an auditory chatbot) associated with the particular context (e.g., the clothes store context). In addition, the training of the speech recognition system can be based on historical user interaction data of the text-based chatbot. For example, the historical user interaction data of the text-based chatbot indicates that a first proportion (e.g., 50%) of phrases received by the text-based chatbot in the particular context (e.g., the clothes store context) are associated with the user intent indicator (e.g., the pay_bill indicator). A speech recognition system can be trained based on speech-to-text training data that gives more weight to the user phrases that are more likely to be used in the particular context, as described herein. The speech recognition system that is trained based on the speech-to-text training data can more accurately recognize the user phrases that are given more weight in the speech-to-text training data. The speech recognition system is thus trained to more accurately recognize user phrases that are more likely to be used in the particular context. A speech recognition system that is trained to more accurately recognize speech associated with a specific context can improve the user experience and reduce customer service costs for that context.

According to techniques described herein, a speech-to-text training data generator has access to IR training data of an IR system (e.g., an interactive text response system, such as a text-based chatbot) associated with a particular context (e.g., the clothes store context). The IR training data indicates a mapping between user intent indicators and input phrases. For example, the IR training data indicates that a first user intent indicator (e.g., a pay_bill indicator) is associated with a first input phrase (e.g., "I want to pay my bill with a credit card"). To illustrate, the IR training data indicates that the IR system is to initiate performance of a user intent (e.g., paying a bill) in response to determining that a user phrase (e.g., "I want to pay my bill with a credit card") received by the IR system maps to the first user intent indicator (e.g., the pay_bill indicator). The IR system generates user interaction data indicating user phrases received by the IR system and corresponding user intent indicators.

The speech-to-text training data generator receives the user interaction data from the IR system and generates distribution data based on the user interaction data. The distribution data indicates that a first proportion (e.g., 25%) of user phrases received by the IR system is associated with the first user intent indicator (e.g., the pay_bill indicator). The speech-to-text training data generator also has access to entity data that indicates term hierarchies for various terms that may be used in the input phrases of the IR training data. A term hierarchy indicates terms that are related to each other, e.g., as synonyms or sub-categories. For example, in a credit card context, entity data indicates a first term hierarchy related to a first term (e.g., "credit card"). The first term hierarchy indicates that a second term (e.g., Visa® (a registered trademark of Visa International Service Association, Foster City, Calif.)) and a third term (e.g., Mastercard® (a registered trademark of Mastercard International Inc., Purchase, N.Y.)) are subcategories of the first term (e.g., "credit card").

The speech-to-text training data generator generates (or updates) speech-to-text training data based on the entity data, the IR training data, and the distribution data. For example, the speech-to-text training data generator generates speech-to-text training phrases associated with the first user intent indicator (e.g., a pay_bill indicator).

To illustrate, in a particular example, the speech-to-text training data generator, in response to determining that the IR training data indicates that the first input phrase (e.g., "I want to pay my bill with a credit card") is associated with the first user intent indicator (e.g., a pay_bill indicator), adds the first input phrase to the speech-to-text training phrases. The speech-to-text training data generator generates a second phrase (e.g., "I want to pay my bill with a Visa®") by replacing the first term (e.g., "credit card") in the first input phrase (e.g., "I want to pay my bill with a credit card") with the second term (e.g., "Visa®") from the first term hierarchy. The second phrase (e.g., "I want to pay my bill with a Visa®") is also associated with the first user intent indicator (e.g., the pay_bill indicator). The speech-to-text training data generator also adds the second phrase (e.g., "I want to pay my bill with a Visa®") to the speech-to-text training phrases.

The speech-to-text training data generator thus automatically generates new phrases (e.g., phrases that have not been received from a user in association with the first user intent indicator and that have not been indicated in training data as associated with the first user intent indicator) associated with the first user intent indicator (e.g., the pay_bill indicator). In some examples, the speech-to-text training data generator adds the first term, the second term, the third term, or a combination thereof, to the speech-to-text training phrases as associated with the first user intent indicator (e.g., the pay_bill indicator).

A technical effect of adding new phrases that are related to the first input phrase is to increase accuracy of a speech-to-text system in recognizing user phrases that are associated with the first user intent indicator (e.g., the pay_bill indicator). For example, the speech-to-text system is trained to recognize phrases including synonyms or subcategories of terms used in corresponding input phrases of the IR training data. Another technical effect of adding the new phrases is having a larger set of phrases in the speech-to-text training phrases database for a relatively smaller set of input phrases of the IR training data. In a particular aspect, the smaller set of input phrases of the IR training data is manually generated by a human (e.g., a data engineer) and the larger set of phrases of the speech-to-text training phrases database is automatically generated by the speech-to-text training data generator. The speech-to-text training phrases database can automatically be more comprehensive with relatively low (e.g., no) additional cost (e.g., human resources, time, or both).

The speech-to-text training data generator selects phrases from the speech-to-text training phrases (e.g., from a data store) to add to the speech-to-text training data such that a second proportion (e.g., 25%) of the speech-to-text training data is associated with the first user intent indicator (e.g., the pay_bill indicator). The second proportion is based on (e.g., is equal to) the first proportion. In a particular example, the speech-to-text training data generator adds the first input phrase (e.g., "I want to pay my bill with a credit card"), the second phrase (e.g., "I want to pay my bill with a Visa®"), the first term (e.g., "credit card"), and the second term (e.g., "Visa®") to the speech-to-text training data. The speech-to-text training data also adds phrases associated with other user intent indicators to the speech-to-text training data.

A higher proportion of the speech-to-text training data associated with the first user intent indicator increases a likelihood of a user phrase to be recognized as one of the phrases associated with the first user intent indicator. For example, if the same phrase is repeated in the speech-to-text training data, the phrase has more weight (e.g., influence) in training the speech-to-text system and the speech-to-text system is more likely to recognize a user phrase as the phrase. As an illustrative example, the speech-to-text training data assigns a first weight to (e.g., includes 5 copies of) a first phrase (e.g., "I want to pay with a credit card") associated with the first user intent indicator (e.g., the pay_bill indicator) that is greater than (e.g., 5 times) a second weight assigned to (e.g., includes 1 copy of) a second phrase (e.g., "Can I pay with a credit card?") associated with a second user intent indicator (e.g., a how_to_pay indicator). A speech recognition system trained based on the speech-to-text training data is more likely (e.g., 5 times more likely) to recognize a user phrase (e.g., "credit card") as the first phrase than as the second phrase. A speech recognition system that is using a speech-to-text model (e.g., a speech recognition model, a hidden markov model, an artificial neural network, or a combination thereof) based on the speech-to-text training data is more likely to recognize speech as matching phrases associated with the first user intent indicator (e.g., the pay_bill indicator) when user phrases associated with the first user intent indicator are more commonly received in the particular context (e.g., the clothes store context). The speech recognition system using the speech-to-text model is more likely to recognize speech as matching phrases that are received more commonly by the IR system in the particular context. Improved speech recognition for commonly used phrases can improve user experience and reduce costs associated with employing human operators.

One or more aspects described herein can be implemented in a cloud computing environment. For example, the speech-to-text training data generator can be implemented as a service that provides speech-to-text training data for a particular context. Although this disclosure includes a detailed description on cloud computing, implementation of the teachings recited herein are not limited to a cloud computing environment. Rather, aspects of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In some implementations, this cloud model may include at least five characteristics, at least three service models, and at least four deployment models, as described herein.

Characteristics are as follows:

On-demand self-service: a cloud consumer can unilaterally provision computing capabilities, such as server time and network storage, as needed automatically without requiring human interaction with the service provider.

Broad network access: capabilities are available over a network and accessed through standard mechanisms that promote use by heterogeneous thin or thick client platforms (e. g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e. g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring to FIG. 1, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. One or more of the nodes 10 may include a speech-to-text training data generator 108. The speech-to-text training data generator 108 may correspond to infrastructure, platforms, and/or software provided as services by the cloud computing environment 50.

Nodes 10 may communicate with one another. They may be grouped (not shown) physically or virtually, in one or more networks, such as Private, Community, Public, or Hybrid clouds as described hereinabove, or a combination thereof. This allows the cloud computing environment 50 to offer infrastructure, platforms and/or software as services for which a cloud consumer does not need to maintain resources on a local computing device.

The speech-to-text training data generator 108 may be configured to generate speech-to-text training data, as further described with reference to FIG. 3. For example, the speech-to-text training data generator 108 has access to entity data that indicates term hierarchies, IR training data that indicates mapping between user intent indicators and input phrases, and distribution data that indicates a proportion of user phrases received by an IR system corresponding to each user intent indicator. The speech-to-text training data generator 108 generates speech-to-text training phrases by identifying a first term of a term hierarchy in an input phrase associated with a first user intent indicator, generating a second phrase by replacing the first term with a second term of the term hierarchy in the input phrase, and adding the second phrase as associated with the first user intent indicator to the speech-to-text training phrases, as further described with reference to FIG. 3. The speech-to-text training data generator 108 thus automatically generates phrases associated with the first user intent indicator based on other phrases associated with the first user intent indicator.

The speech-to-text training data generator 108, in response to determining that a first proportion of the user phrases received by the IR system correspond to the first user intent indicator, selects speech-to-text training phrases to add to the speech-to-text training data such that a second proportion of phrases of the speech-to-text training data correspond to the first user intent indicator, as further described with reference to FIG. 3. The second proportion is based on the first proportion. A speech-to-text model, based on the speech-to-text training data, is trained on phrases associated with user intent indicators in proportion to the phrases associated with the user intent indicators that are received by the IR system. A speech recognition system based on the speech-to-text model is thus more likely to recognize speech as matching phrases associated with a user intent indicator for which user phrases are more commonly received by the IR system.

The types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
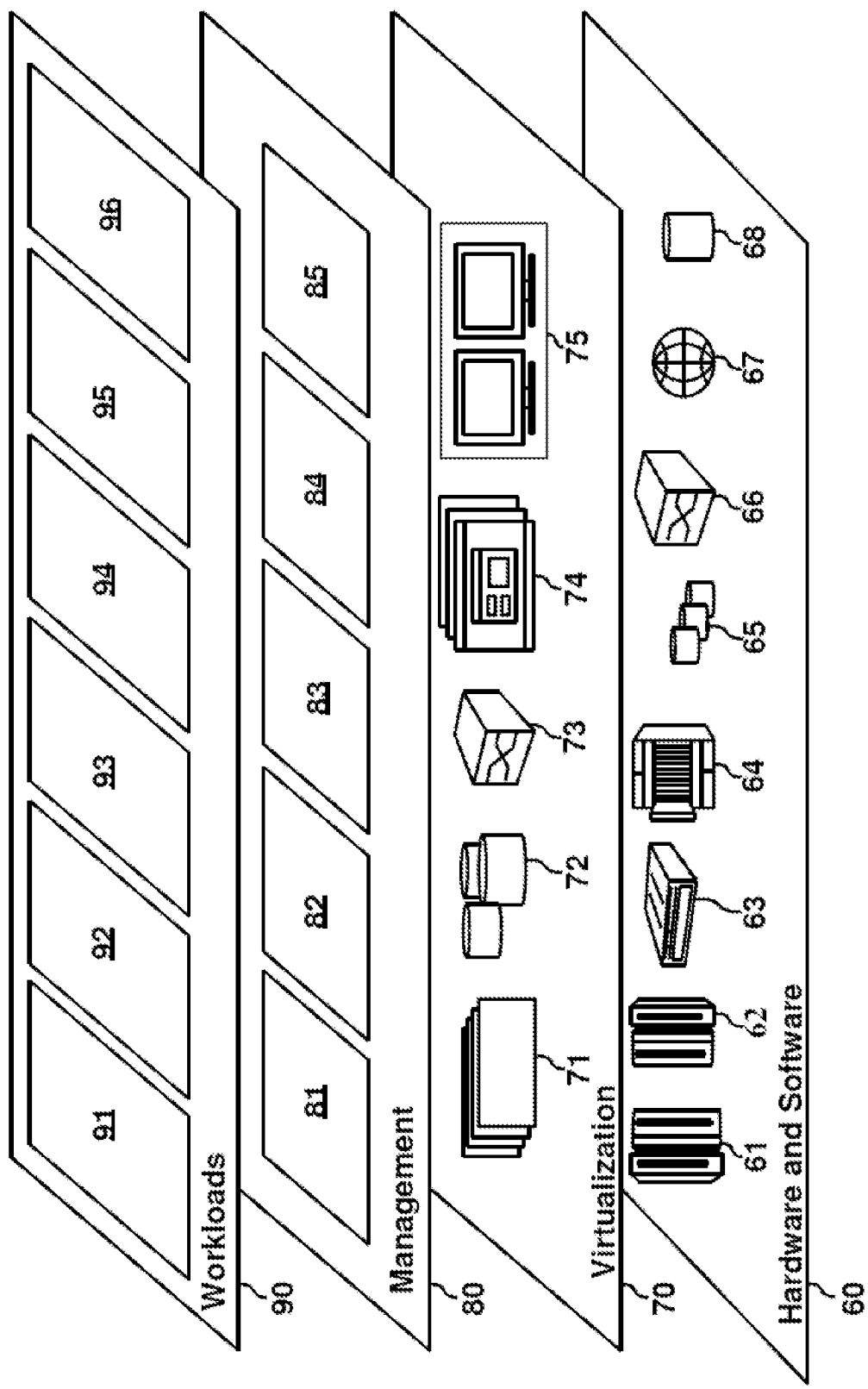
FIG. 2 illustrates abstraction model layers according to an aspect of the disclosure.

Referring to FIG. 2, a set of functional abstraction layers provided by cloud computing environment 50 (FIG. 1) is shown. One or more of the abstraction layers provide functionality of the speech-to-text training data generator 108 of FIG. 1, as described herein. It should be understood in advance that the components, layers, and functions shown in FIG. 2 are intended to be illustrative only and aspects of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech-to-text training data generation 96. In a particular aspect, the speech-to-text training data generation 96 may include speech-to-text training data generation, as described herein with reference to the speech-to-text training data generator 108.

Figure 3:
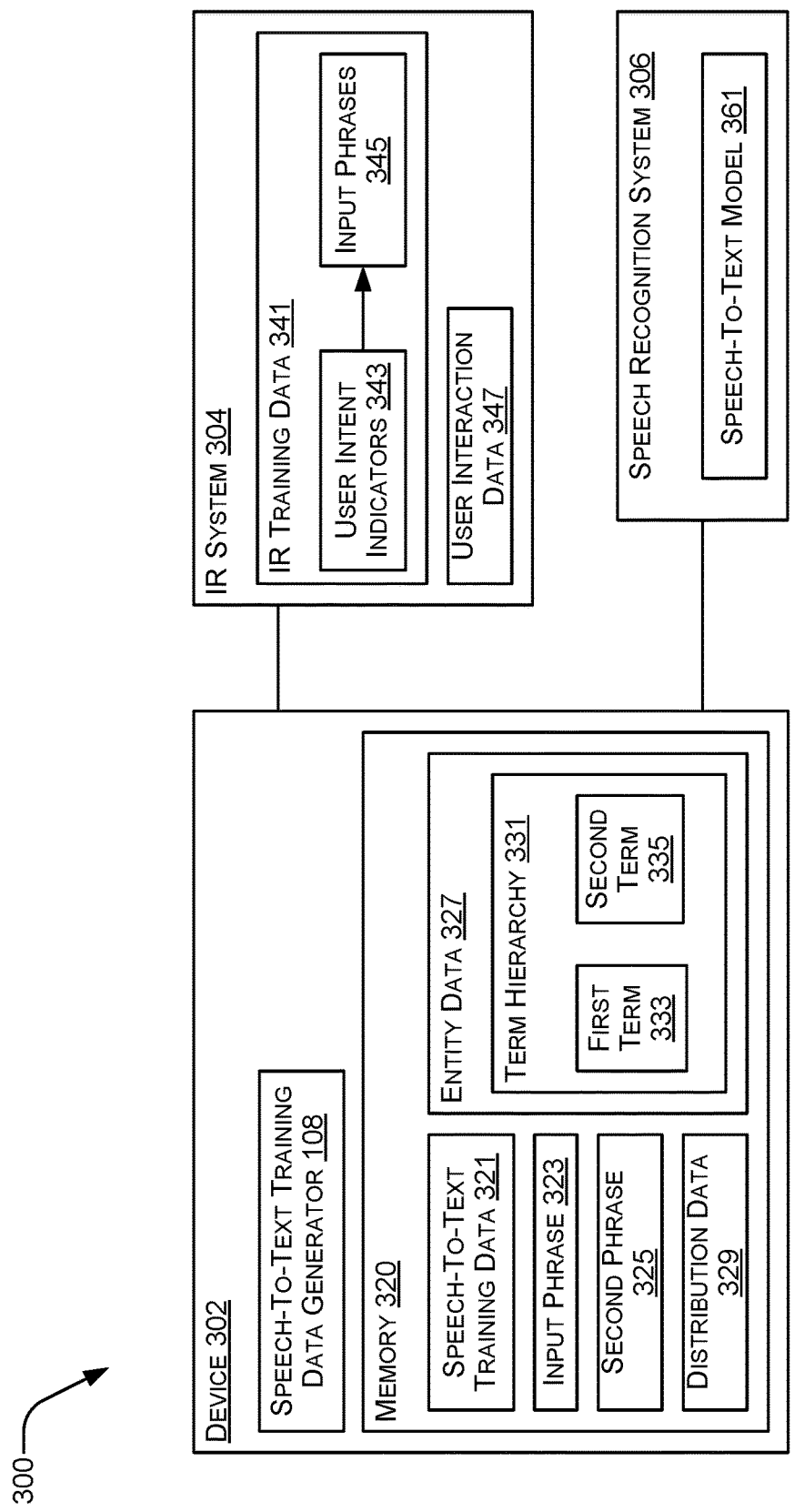
FIG. 3 illustrates a system for generating speech-to-text training data.

FIG. 3 illustrates a system 300 for performing speech-to-text training data generation. The system 300 includes a device 302. The device 302 may include a processor, a computer, a laptop computer, a server, a communication device, an entertainment device, or a combination thereof. The device 302 includes (or accesses) the speech-to-text training data generator 108, a memory 320, or both. The speech-to-text training data generator 108 may correspond to software, such as instructions executable by a processor to perform one or more operations described with reference to FIGS. 1-8. In a particular aspect, the speech-to-text training data generator 108 may correspond to a processor configured to perform one or more operations described with reference to FIGS. 1-8.

In FIG. 3, the device 302 is coupled to an IR system 304 and to a speech recognition system 306. It should be understood that the IR system 304 and the speech recognition system 306 external to the device 302 are provided as an illustrative example. In some implementations, the device 302 includes one or more components of the IR system 304, the speech recognition system 306, or both. The IR system 304 may correspond to software, such as instructions executable by a processor to perform one or more operations described with reference to FIGS. 1-8. In a particular aspect, the IR system 304 may correspond to a processor configured to perform one or more operations described with reference to FIGS. 1-8. The speech recognition system 306 may correspond to software, such as instructions executable by a processor to perform one or more operations described with reference to FIGS. 1-8. In a particular aspect, the speech recognition system 306 may correspond to a processor configured to perform one or more operations described with reference to FIGS. 1-8.

In a particular aspect, the device 302 may correspond to one or more of the cloud computing nodes 10 of FIG. 1. For example, the device 302 may provide the speech-to-text training data generator 108 (e.g., software corresponding to the speech-to-text training data generator 108) or functions of the speech-to-text training data generator 108 as a service. In an alternate aspect, the device 302 may correspond to a cloud consumer device, such as, for example, the PDA or cellular telephone 54A, the desktop computer 54B, the laptop computer 54C, the automobile computer system 54N of FIG. 1, or a combination thereof. The device 302 may receive the speech-to-text training data generator 108 (e.g., software corresponding to the speech-to-text training data generator 108) or access functions of the speech-to-text training data generator 108 as a service provided by one or more of the cloud computing nodes 10 of FIG. 1.

The memory 320 may be configured to store entity data 327. The entity data 327 may be previously generated by the device 302, received by the device 302 from another device, provided by a user to the device 302, or a combination thereof. The entity data 327 indicates one or more term hierarchies. Each term hierarchy of the entity data 327 corresponds to a data structure (e.g., a tree structure) that indicates related terms, as further described with reference to FIG. 4. For example, the entity data 327 includes a term hierarchy 331. The term hierarchy 331 indicates that a first term 333 is related to a second term 335. In a particular example, the term hierarchy 331 indicates that the second term 335 (e.g., Visa®) is a subcategory of the first term 333 (e.g., credit card).

The IR system 304 includes an interactive text response system, an interactive voice response system, or both. In a particular aspect, the IR system 304 includes a computer program (e.g., a chatbot) which conducts a conversation via auditory or textual methods. The IR system 304 has access to IR training data 341. The IR training data 341 may be previously generated by the IR system 304, received by the IR system 304 from the device 302 (or another device), provided by a user to the IR system 304, or a combination thereof. The IR training data 341 indicates mapping between user intent indicators 343 and input phrases 345, as further described with reference to FIG. 4. The IR system 304 generates user interaction data 347 based on conversations (e.g., textual or auditory conversations) with users. The user interaction data 347 indicates user phrases received from users and corresponding user intent indicators. For example, the IR system 304 receives a first user phrase (e.g., "I want to pay my bill with a credit card") from a user. The IR system 304 determines that the IR training data 341 indicates that the input phrases 345 include the first user phrase (e.g., "I want to pay my bill with a credit card") and that the first user phrase maps to a first user intent indicator (e.g., a pay bill indicator) of the user intent indicators 343. The IR system 304 updates the user interaction data 347 to indicate that the IR system 304 received the first user phrase (e.g., "I want to pay my bill with a credit card") associated with the first user intent indicator from a user.

The speech-to-text training data generator 108 has access to distribution data 329. In some implementations, the speech-to-text training data generator 108 is configured to receive the user interaction data 347 from the IR system 304 and generate the distribution data 329 based on the user interaction data 347. In some implementations, the IR system 304 generates the distribution data 329 and the speech-to-text training data generator 108 receives the distribution data 329 from the IR system 304. The distribution data 329 indicates proportions of input phrases received by the IR system 304 from users that correspond to the user intent indicators 343, as further described with reference to FIG. 4. For example, the distribution data 329 indicates that a first proportion of user phrases received by the IR system 304 correspond to a first user intent indicator (e.g., a pay bill indicator), a second proportion of the user phrases received by the IR system 304 correspond to a second user intent indicator (e.g., a contact human indicator), or both.

During operation, the speech-to-text training data generator 108 may determine that speech-to-text training data 321 is to be generated (or updated). For example, the speech-to-text training data generator 108 may receive user input from a user indicating that the speech-to-text training data 321 is to be generated (or updated). The speech-to-text training data generator 108 accesses the IR training data 341. In a particular aspect, the IR training data 341 corresponds to a first IR corpus associated with a first context (e.g., an online shopping application). The speech-to-text training data generator 108 generates speech-to-text training phrases based on the IR training data 341 and the entity data 327, as further described with reference to FIGS. 4-5B. For example, the speech-to-text training data generator 108 determines that the IR training data 341 indicates that a first user intent indicator (e.g., a pay_bill indicator) is associated with an input phrase 323 (e.g., "I want to pay my bill with a credit card"). The speech-to-text training data generator 108 determines whether the input phrase 323 includes any terms indicated by the entity data 327. To illustrate, the speech-to-text training data generator 108 determines that the input phrase 323 includes the first term 333 (e.g., "credit card") of the term hierarchy 331. The speech-to-text training data generator 108 generates the second phrase 325 (e.g., "I want to pay my bill with a Visa®") by replacing, in the input phrase 323, the first term 333 (e.g., "credit card") with the second term 335 (e.g., "Visa®") of the term hierarchy 331. The speech-to-text training data generator 108 adds the second phrase 325 to the speech-to-text training phrases as associated with the first user intent indicator (e.g., a pay_bill indicator). The speech-to-text training data generator 108 thus automatically generates a new phrase (e.g., the second phrase 325) associated with the first user intent indicator (e.g., a pay_bill indicator) based on the input phrase 323 and the term hierarchy 331.

In some aspects, the speech-to-text training data generator 108 generates additional phrases based on the input phrase 323 (e.g., "I want to pay my bill with a credit card"), the term hierarchy 331, or both, as further described with reference to FIGS. 4-5B. The speech-to-text training data generator 108 adds the additional phrases as associated with the first user intent indicator (e.g., a pay_bill indicator) to the speech-to-text training phrases. The speech-to-text training data generator 108 may similarly generate a second set of speech-to-text training phrases associated with a second user intent indicator (e.g., a contact human indicator) of the user intent indicators 343 and add the second set of speech-to-text training phrases to the speech-to-text training phrases, as further described with reference to FIGS. 4-5B. The speech-to-text training phrases thus include a first set of speech-to-text training phrases associated with the first user intent indicator (e.g., a pay_bill indicator), the second set of speech-to-text training phrases associated with the second user intent indicator (e.g., a contact_human indicator), an additional set of speech-to-text training phrases associated with an additional user intent indicator, or a combination thereof.

The speech-to-text training data generator 108 uses the speech-to-text training phrases to generate (or update) the speech-to-text training data 321 based on the distribution data 329, as further described with reference to FIGS. 4 and 6. For example, the distribution data 329 indicates that a first proportion (e.g., 25%) of user inputs received by the IR system 304 correspond to the first user intent indicator (e.g., a pay_bill indicator), a second proportion of the user inputs (e.g., 50%) received by the IR system 304 correspond to the second user intent indicator (e.g., a contact human indicator), a third proportion of the user inputs (e.g., 25%) received by the IR system 304 correspond to a third user intent indicator (e.g., a how_to_pay indicator), or a combination thereof. The speech-to-text training data generator 108 generates (or updates) the speech-to-text training data 321 by selecting phrases from the speech-to-text training phrases such that the first proportion (e.g., 25%) of phrases of the speech-to-text training data 321 are associated with the first user intent indicator, the second proportion (e.g., 50%) of the phrases of the speech-to-text training data 321 are associated with the second user intent indicator, the third proportion (e.g., 25%) of the speech-to-text training data 321 are associated with the third user intent indicator, or a combination thereof, as further described with reference to FIGS. 4 and 6.

The speech-to-text training data generator 108 provides the speech-to-text training data 321 to the speech recognition system 306 to initiate an update (or generation) of the speech-to-text model 361. In a particular aspect, the speech-to-text training data 321 corresponds to a first speech-to-text corpus associated with a second context. The second context may be related to the first context associated with the IR training data 341, as described herein. The speech recognition system 306 trains (e.g., generates or updates) a speech-to-text model 361 based on the speech-to-text training data 321. In a particular aspect, the speech-to-text model 361 includes a hidden markov model, an artificial neural network, or both.

The speech recognition system 306 (e.g., a speech recognition engine) performs speech recognition based on the speech-to-text model 361. For example, the speech recognition system 306 receives an input audio signal via an input interface from a microphone, another device, or both. The speech recognition system 306 determines, based on the speech-to-text model 361, that the input audio signal matches the second phrase 325.

The speech recognition system 306 (or another system that is coupled to or includes the speech recognition system 306) is configured to, in response to determining that the input audio signal matches the second phrase 325, process the first user intent indicator, generate an output indicating that the input audio signal matches the second phrase 325, or both. For example, the speech recognition system 306 can indicate, via a display or a speaker, that the input audio signal matches the second phrase 325. Processing the first user intent indicator includes initiating operations corresponding to a user intent indicated by the first user intent indicator. In a particular example, the first user intent indicator includes a financial transaction performance indicator (e.g., a pay_bill indicator). In this example, processing the first user intent indicator includes initiating a financial transaction. To illustrate, the speech recognition system 306 (or another system that is coupled to or includes the speech recognition system 306) processes the first user intent indicator by prompting the user to provide financial information (e.g., a credit card number). The speech recognition system 306 can prompt the user by displaying a graphical user interface requesting the financial information, generating an audio signal including speech (e.g., pre-recorded speech) requesting the financial information, or both.

In a particular example, the first user intent indicator includes a human operator contact indicator (e.g., a contact_human indicator). In this example, processing the first user intent indicator includes initiating contact with a human operator. To illustrate, the speech recognition system 306 (or another system that is coupled to or includes the speech recognition system 306) processes the first user intent indicator by transferring a call to a human operator. The speech recognition system 306 can display a graphical user interface indicating that a human operator is being contacted, generate an audio signal including speech (e.g., pre-recorded speech) indicating that a human operator is being contacted, or both.

In a particular example, the first user intent indicator includes an information request indicator (e.g., a how_to_pay indicator). In this example, processing the first user intent indicator includes providing the information. To illustrate, the speech recognition system 306 (or another system that is coupled to or includes the speech recognition system 306) processes the first user intent indicator by providing, via display or a speaker, information (e.g., payment information) associated with the information request indicator (e.g., a how_to_pay indicator).

The speech recognition system 306 is more likely, as compared to a general purpose speech recognition system, to recognize speech that is commonly received in a similar context as associated with the user interaction data 347. In a particular example, the IR system 304 (e.g., a chatbot) generates the user interaction data 347 in a first context (e.g., an online shopping application). The speech recognition system 306 is more likely to recognize, based on the speech-to-text model 361, speech that is commonly received in a second context (e.g., phone customer service for a shop) that is related to the first context (e.g., an online shopping application). In a particular example, the IR system 304 corresponds to an interactive text response system (e.g., a chatbot) associated with a first context (e.g., an online shopping application) and the speech recognition system 306 corresponds to an interactive voice response system (e.g., a phone helpline) associated with the first context (e.g., the online shopping application).

In a particular example, the IR system 304 includes the speech recognition system 306. To illustrate, the speech-to-text model 361 is initialized, e.g., as a general-purpose speech-to-text model or based at least in part on the input phrases 345. The IR system 304 generates the user interaction data 347 based on speech recognition performed by the speech recognition system 306. The speech-to-text training data generator 108 generates the speech-to-text training data 321 based on the IR training data 341, the entity data 327, and the user interaction data 347, as described herein. The speech recognition system 306 updates the speech-to-text model 361 based on the speech-to-text training data 321. The update to the speech-to-text model 361 increases a likelihood of the speech recognition system 306 recognizing speech as matching phrases associated with a user intent indicator for which user phrases are more commonly received by the IR system 304. Improved speech recognition for commonly used phrases can improve user experience and reduce costs associated with employing human operators.

In a particular implementation, the accuracy of the speech recognition system 306 improves over time as the speech-to-text model 361 is iteratively updated based on updates to the user interaction data 347. The iterative updates of the speech-to-text model 361 can enable the speech recognition system 306 to dynamically adapt to a changing environment. For example, if, over time, a higher proportion of user phrases received by the IR system 304 is associated with a particular user intent indicator, the speech-to-text model 361 is trained based on more phrases associated with the particular user intent indicator and the likelihood of the speech recognition system 306 recognizes speech as matching phrases associated with the particular user intent indicator improves.

FIGS. 4-6 provide an illustrative example of speech-to-text training data generation that may be performed by the system 300 of FIG. 3. FIG. 4 illustrates examples of the entity data 327, the IR training data 341, and the distribution data 329 of FIG. 3. FIG. 5A illustrates examples of speech-to-text training phrases that may be generated by the speech-to-text training data generator 108 based on the examples of the entity data 327 and the IR training data 341 shown in FIG. 4. FIG. 5B illustrates examples of adding terms to the speech-to-text training phrases shown in FIG. 5A. FIG. 6 illustrates an example of the speech-to-text training data 321 generated by the speech-to-text training data generator 108 based on the distribution data 329 and the examples of the speech-to-text training phrases shown in FIG. 5B.

Referring to FIG. 4, examples of the entity data 327, the IR training data 341, and the distribution data 329 are shown. In a particular aspect, one or more of the nodes 10, the speech-to-text training data generator 108 of FIG. 1, the device 302, the IR system 304, the system 300 of FIG. 3, or a combination thereof, generate the entity data 327, the IR training data 341, the distribution data 329, or a combination thereof.

The entity data 327 includes a term hierarchy 401, a term hierarchy 403, or both. It should be understood that two term hierarchies are shown as an illustrative example. In other examples, the entity data 327 includes fewer or more than two term hierarchies. In a particular aspect, the term hierarchy 331 of FIG. 3 corresponds to the term hierarchy 401, the term hierarchy 403, or both.

The term hierarchy 401 includes a term 411 (e.g., "Credit Card") related to a term 421 (e.g., "Visa®") and to a term 423 (e.g., "Mastercard®"). In a particular aspect, the term hierarchy 401 is represented by a tree structure, where the term 411 is a parent of the term 421 and the term 423. For example, each of the term 421 and the term 423 is a subcategory of the term 411. It should be understood that a tree structure of the term hierarchy 401 is provided as an illustrative example. In other examples, the term hierarchy 401 is represented by another data structure, such as a table, a set, a list, or a combination thereof. It should be understood that the term hierarchy 401 includes 3 terms as an illustrative example. In other examples, the term hierarchy 401 includes fewer than 3 terms or more than 3 terms. The term hierarchy 403 includes a term 413 (e.g., "Agent") related to a term 425 (e.g., "Human") and to a term 427 (e.g., "Person"). It should be understood that the term hierarchy 403 having the same count of terms as the term hierarchy 401 is provided as an illustrative example. In other examples, the term hierarchy 403 includes fewer terms than the term hierarchy 401 or more terms than the term hierarchy 401.

The IR training data 341 indicates that an input phrase 441 (e.g., "I want to pay my bill with a credit card"), an input phrase 443 (e.g., "I need to speak to a human"), and an input phrase 445 (e.g., "Can I pay with a credit card?") correspond to to a user intent indicator 431 (e.g., a pay_bill indicator), a user intent indicator 433 (e.g., a contact_human indicator), and a user intent indicator 435 (e.g., a how_to_pay indicator), respectively.

In a particular aspect, the user intent indicator 431 (e.g., a pay_bill indicator) corresponds to a financial transaction performance indicator. For example, the input phrase 441 corresponding to the user intent indicator 431 indicates that a user is requesting performance of a financial transaction. In a particular aspect, the user intent indicator 433 (e.g., a contact_human indicator) corresponds to a human operator contact indicator. For example, the input phrase 443 corresponding to the user intent indicator 433 indicates that a user is requesting contact with a human operator. In a particular aspect, the user intent indicator 435 (e.g., a how_to_pay indicator) corresponds to an information request indicator. For example, the input phrase 445 corresponding to the user intent indicator 435 indicates that a user is requesting information.

The user intent indicators 343 of FIG. 3 include the user intent indicator 431, the user intent indicator 433, the user intent indicator 435, or a combination thereof. The input phrases 345 of FIG. 3 include the input phrase 441, the input phrase 443, the input phrase 445, or a combination thereof. It should be understood that a one-to-one mapping between the user intent indicators 343 and the input phrases 345 is provided as an illustrative example. In other examples, one or more of the user intent indicators 343 correspond to multiple input phrases of the input phrases 345.

The distribution data 329 indicates that a proportion 461 (e.g., 25%), a proportion 463 (e.g., 50%), and a proportion 465 (e.g., 25%) of user phrases received by the IR system 304 of FIG. 3 correspond to the user intent indicator 431 (e.g., a pay_bill indicator), the user intent indicator 433 (e.g., a contact_human indicator), and the user intent indicator 435 (e.g., a how_to_pay indicator), respectively.

Referring to FIG. 5A, examples of speech-to-text training phrases are shown and generally designated 508. In a particular aspect, the speech-to-text training phrases 508 are generated by one or more of the nodes 10, the speech-to-text training data generator 108 of FIG. 1, the device 302, the system 300 of FIG. 3, or a combination thereof.

The speech-to-text training data generator 108, in response to determining that the IR training data 341 of FIG. 3 indicates that the user intent indicator 431 (e.g., a pay_bill indicator) of FIG. 4 is associated with the input phrase 441 (e.g., "I want to pay my bill with a credit card") of FIG. 4, generates a set of phrases 530 associated with the user intent indicator 431. For example, the speech-to-text training data generator 108 generates a phrase 531 of the set of phrases 530 by copying the input phrase 441. The speech-to-text training data generator 108 generates additional phrases associated with the user intent indicator 431 by determining that the input phrase 441 includes a term of a term hierarchy and replacing the term in the input phrase 441 with related terms from the term hierarchy. For example, the speech-to-text training data generator 108 determines that the input phrase 441 (e.g., "I want to pay my bill with a credit card") includes the term 411 (e.g., "Credit Card") of the term hierarchy 401. The speech-to-text training data generator 108 determines that the term hierarchy 401 indicates that the term 421 (e.g., "Visa®") and the term 423 (e.g., "Mastercard®") are related to the term 411 (e.g., "Credit Card"). The speech-to-text training data generator 108 generates a phrase 533 (e.g., "I want to pay my bill with a Visa®") by replacing the term 411 (e.g., "Credit Card") with the term 421 (e.g., "Visa®") in the input phrase 441 (e.g., "I want to pay my bill with a credit card"). The speech-to-text training data generator 108 generates a phrase 535 (e.g., "I want to pay my bill with a Mastercard®") by replacing the term 411 (e.g., "Credit Card") with the term 423 (e.g., "Mastercard®") in the input phrase 441 (e.g., "I want to pay my bill with a credit card"). In a particular aspect, the input phrase 441 includes multiple terms from one or more term hierarchies and the speech-to-text training data generator 108 generates phrases by replacing multiple terms in the input phrase 441 with related terms from the one or more term hierarchies. The set of phrases 530 include the phrase 533 (e.g., "I want to pay my bill with a Visa®"), the phrase 535 (e.g., "I want to pay my bill with a Mastercard®"), or both.

The speech-to-text training data generator 108, in response to determining that the IR training data 341 of FIG. 3 indicates that the user intent indicator 433 (e.g., a contact_human indicator) of FIG. 4 is associated with the input phrase 443 (e.g., "I need to speak to a human") of FIG. 4, generates a set of phrases 550 associated with the user intent indicator 433. The set of phrases 550 includes a phrase 551 (e.g., "I need to speak to a human"), a phrase 553 (e.g., "I need to speak to an agent"), a phrase 555 (e.g., "I need to speak to a person"), or a combination thereof.

The speech-to-text training data generator 108, in response to determining that the IR training data 341 of FIG. 3 indicates that the user intent indicator 435 (e.g., a how_to_pay indicator) of FIG. 4 is associated with the input phrase 445 (e.g., "Can I pay with a credit card?") of FIG. 4, generates a set of phrases 570 associated with the user intent indicator 435. The set of phrases 570 includes a phrase 571 (e.g., "Can I pay with a credit card?"), a phrase 573 (e.g., "Can I pay with a Visa®?"), a phrase 575 (e.g., "Can I pay with a Mastercard®?"), or a combination thereof.

Referring to FIG. 5B examples of the speech-to-text training phrases 508 are shown. In a particular aspect, the speech-to-text training phrases 508 are generated by one or more of the nodes 10, the speech-to-text training data generator 108 of FIG. 1, the device 302, the system 300 of FIG. 3, or a combination thereof.

The speech-to-text training data generator 108, in response to determining that an input phrase associated with a user intent indicator includes a term of a term hierarchy, adds terms from the term hierarchy to the set of phrases associated with the user intent indicator. For example, the speech-to-text training data generator 108, in response to determining that the input phrase 441 (e.g., "I want to pay my bill with a credit card") associated with the user intent indicator 431 (e.g., a pay_bill indicator) includes the term 411 (e.g., "Credit Card") of the term hierarchy 401, adds the term 411 (e.g., "Credit Card"), the term 421 (e.g., "Visa®"), the term 423 (e.g., "Mastercard®") of the term hierarchy 401, or a combination thereof, to the set of phrases 530 associated with the user intent indicator 431. To illustrate, the speech-to-text training data generator 108 adds the phrase 537, the phrase 539, and the phrase 541 corresponding to the term 411 (e.g., "Credit Card"), the term 421 (e.g., "Visa®"), and the term 423 (e.g., "Mastercard®"), respectively, to the set of phrases 530.

In a particular example, the speech-to-text training data generator 108, in response to determining that the input phrase 443 (e.g., "I need to speak to a human") associated with the user intent indicator 433 (e.g., a contact_human indicator) includes the term 425 (e.g., "Human") of the term hierarchy 403, adds the term 413 (e.g., "Agent"), the term 425 (e.g., "Human"), the term 427 (e.g., "Person") of the term hierarchy 403, or a combination thereof, to the set of phrases 550 associated with the user intent indicator 433. To illustrate, the term 413 (e.g., "Agent"), the term 425 (e.g., "Human"), and the term 427 (e.g., "Person") are added as a phrase 557, a phrase 559, and a phrase 561, respectively, to the set of phrases 550.

The speech-to-text training data generator 108 adds, based on the term hierarchy 401 and the input phrase 445, a phrase 537 (e.g., "Credit Card"), a phrase 539 (e.g., "Visa®"), a phrase 541 (e.g., "Mastercard®), or a combination thereof, to the set of phrases 570 associated with the user intent indicator 435 (e.g., a how_to_pay indicator).

The speech-to-text training data generator 108 thus automatically generates new phrases (e.g., the phrases 533-541) associated with the user intent indicator 431 (e.g., a pay_bill indicator) independently of user input or training data indicating that the new phrases are associated with the user intent indicator 431 (e.g., a pay_bill indicator). In a particular implementation, with a robust set of term hierarchies, the speech-to-text training data generator 108 can generate a large set of phrases from a relatively small number of the input phrases 345. Automatic generation of a large set of phrases reduces time and human effort in generating a robust speech-to-text model 361. A robust speech-to-text model 361 improves the accuracy of the speech recognition system 306, thereby improving user experience.

Referring to FIG. 6, an example of the speech-to-text training data 321 is shown. In a particular aspect, the speech-to-text training data 321 is generated by one or more of the nodes 10, the speech-to-text training data generator 108 of FIG. 1, the device 302, the system 300 of FIG. 3, or a combination thereof.

The speech-to-text training data generator 108 generates the speech-to-text training data 321 based on the distribution data 329 of FIG. 3 and the speech-to-text training phrases 508. For example, the speech-to-text training data generator 108 determines that the distribution data 329 indicates that the proportion 461 (e.g., 25%), the proportion 463 (e.g., 50%), and the proportion 465 (e.g., 25%) of the user phrases received by the IR system 304 are associated with the user intent indicator 431 (e.g., a pay_bill indicator), the user intent indicator 433 (e.g., a contact_human indicator), and the user intent indicator 435 (e.g., a how_to_pay indicator), respectively.

The speech-to-text training data generator 108 generates the speech-to-text training data 321 by selecting the proportion 461 (e.g., 25%) of selected phrases from the set of phrases 530, the proportion 463 (e.g., 50%) of the selected phrases from the set of phrases 550, the proportion 465 (e.g., 25%) of the selected phrases from the set of phrases 570, or a combination thereof. For example, the speech-to-text training data generator 108 determines a total count of phrases (e.g., 32 phrases) to be added to the speech-to-text training data 321. In a particular implementation, the total count of phrases is based on a default value, a user input, a configuration setting, or a combination thereof. The speech-to-text training data generator 108 determines a count of phrases associated with a user intent indicator based on a corresponding proportion and the total count of phrases. For example, the speech-to-text training data generator 108 determines a first count of phrases (e.g., 8 phrases=25%*32 phrases) associated with the user intent indicator 431 (e.g., a pay_bill indicator) based on the proportion 461 and the total count of phrases (e.g., the first count of phrases=the proportion 461*the total count of phrases).

The speech-to-text training data generator 108 selects the first count of phrases (e.g., 8 phrases) from the set of phrases 530 associated with the user intent indicator 431 and adds the selected phrases to the speech-to-text training data 321. For example, the speech-to-text training data generator 108 adds the phrases 531, 533, 535, 537, 539, 541, 531, and 539 to the speech-to-text training data 321. In a particular aspect, the speech-to-text training data generator 108 adds multiple copies of the same phrase of the set of phrases 530 to the speech-to-text training data 321. For example, the first count of phrases (e.g., the 8 phrases) includes two copies of the phrase 531. In a particular aspect, a phrase of the speech-to-text training phrases 508 is repeated multiple times in the speech-to-text training data 321. In a particular aspect, a phrase of the speech-to-text training phrases 508 is absent from the speech-to-text training data 321.

In a particular example, the speech-to-text training data generator 108 selects a second count of phrases (e.g., 16 phrases) from the set of phrases 550 associated with the user intent indicator 433 (e.g., a contact human indicator) and adds the second count of phrases to the speech-to-text training data 321. For example, the speech-to-text training data generator 108 adds the phrases 551, 553, 555, 557, 559, 561, 551, 553, 557, 559, 561, 551, 553, 555, 559, and 561 to the speech-to-text training data 321.

In a particular example, the speech-to-text training data generator 108 selects a third count of phrases (e.g., 8 phrases) from the set of phrases 570 associated with the user intent indicator 435 (e.g., a how_to_pay indicator) and adds the third count of phrases to the speech-to-text training data 321. For example, the speech-to-text training data generator 108 adds the phrases 571, 573, 575, 537, 539, 541, 575, and 541 to the speech-to-text training data 321.

In a particular implementation, the speech-to-text training data generator 108 adds a single copy of a phrase in the speech-to-text training data 321 and assigns a weight to each phrase of the speech-to-text training data 321. In this implementation, a first weight of phrases selected from the set of phrases 530 has the proportion 461 (e.g., 25%) relative to the total weight of phrases selected from the speech-to-text training phrases 508. For example, the speech-to-text training data generator 108 selects the phrases 531, 533, 535, 537, 539, and 541 from the set of phrases 530. The speech-to-text training data generator 108 specifies a first weight (e.g., 1) for each of the phrases 533, 535, 537, and 541, and a second weight (e.g., 2) for each of the phrases 531 and 539. A first weight (e.g., 8) of phrases has the proportion 461 (e.g., 25%) relative to a total weight (e.g., 32) of phrases selected from the speech-to-text training phrases 508. The speech-to-text training data generator 108 adds the phrases 531, 533, 535, 537, 539, and 541 with the corresponding weights to the speech-to-text training data 321.

In a particular aspect, the speech-to-text training data generator 108, in response to determining that a phrase to be added to the speech-to-text training data 321 has previously been added to the speech-to-text training data 321, updates a corresponding weight of the phrase. For example, the speech-to-text training data 321 selects the phrases 537, 539, 541, 571, 573, and 575 from the set of phrases 570. The speech-to-text training data 321 specifies a first weight (e.g., 1) for each of the phrases 537, 539, 571, and 573, and a second weight (e.g., 2) for each of the phrases 541 and 575. The speech-to-text training data 321, in response to determining that the phrase 537 has previously been added to the speech-to-text training data 321, updates (e.g., increments) a weight (e.g., 1+1=2) of the phrase 537 based on the first weight (e.g., 1) in the speech-to-text training data 321. As another example, the speech-to-text training data 321, in response to determining that the phrase 541 has previously been added to the speech-to-text training data 321, updates (e.g., increments) a weight (e.g., 1+2=3) of the phrase 541 based on the second weight (e.g., 2) in the speech-to-text training data 321.

The speech recognition system 306 trains the speech-to-text model 361 based on the speech-to-text training data 321. The speech-to-text training data 321 includes more phrases (or higher weighted phrases) associated with a user intent indicator for which the IR system 304 receives more user phrases. Training the speech-to-text model 361 based on the speech-to-text training data 321 improves the accuracy of the speech recognition system 306 in recognizing user phrases that are more likely to be received by the speech recognition system 306.

Figure 7:
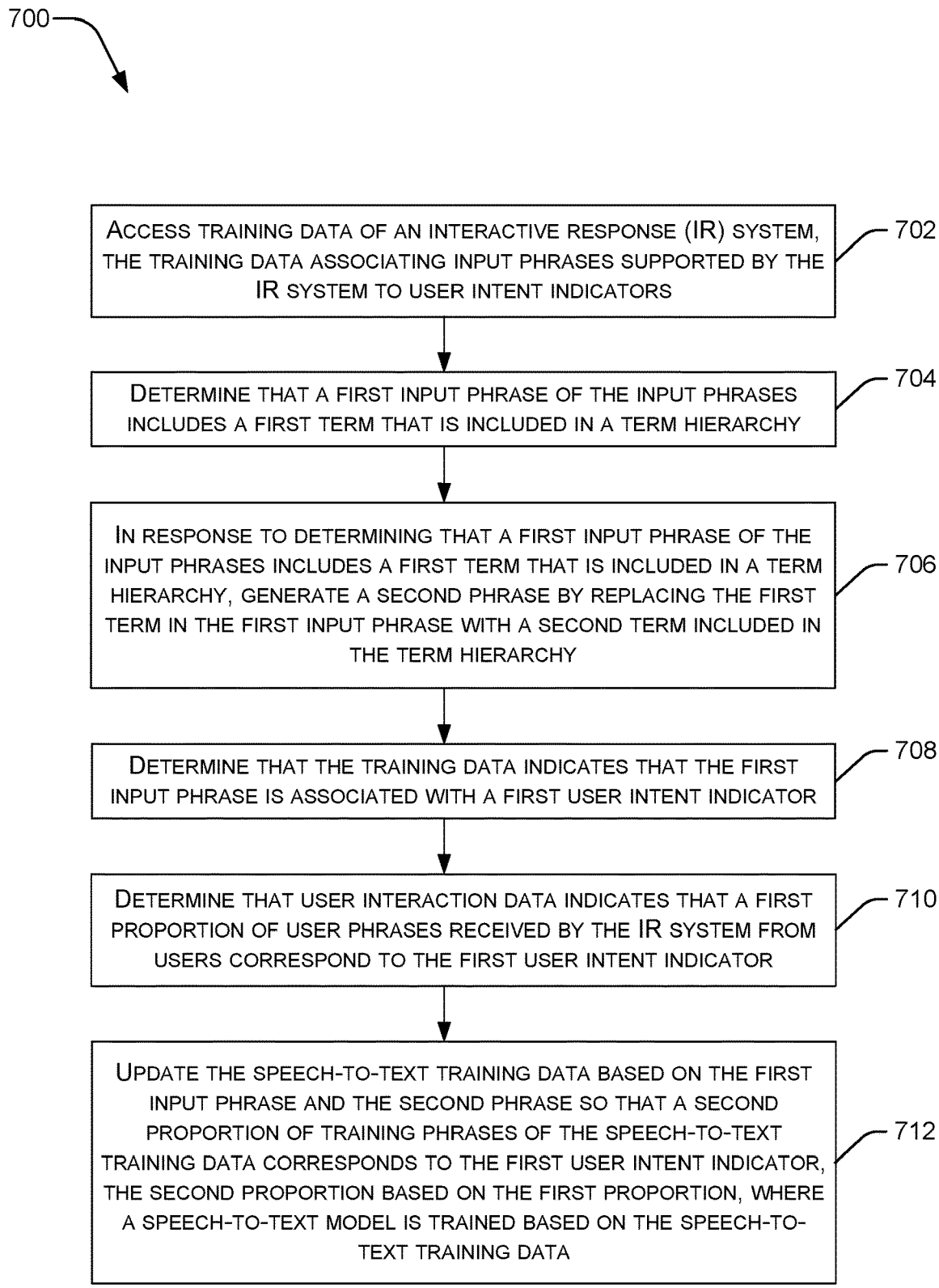
FIG. 7 is a flowchart that illustrates a method of speech-to-text training data generation.

FIG. 7 illustrates a method 700 for generating speech-to-text training data. The method 700 may be performed by one or more of the nodes 10, the speech-to-text training data generator 108 of FIG. 1, the device 302, the system 300 of FIG. 3, or a combination thereof. In a particular aspect, the speech-to-text training data generation 96 may include at least a portion of the method 700.

The method 700 includes accessing training data of an interactive response (IR) system, at 702. For example, the speech-to-text training data generator 108 of FIG. 1 accesses the IR training data 341 of the IR system 304 of FIG. 3. The IR training data 341 associates the input phrases 345 supported by the IR system 304 to the user intent indicators 343, as described with reference to FIG. 3.

The method 700 also includes determining that a first input phrase of the input phrases includes a first term that is included in a term hierarchy, at 704. For example, the speech-to-text training data generator 108 of FIG. 1 determines that the input phrase 441 of the input phrases 345 includes the term 411 (e.g., "Credit Card") that is included in the term hierarchy 401, as described with reference to FIGS. 4-5A.

The method 700 further includes, in response to determining that a first input phrase of the input phrases includes a first term that is included in a term hierarchy, generating a second phrase by replacing the first term in the first input phrase with a second term included in the term hierarchy, at 706. For example, the speech-to-text training data generator 108 of FIG. 1, in response to determining that the input phrase 441 includes the term 411 (e.g., "Credit Card"), generates the phrase 533 by replacing the term 411 in the input phrase 441 with the term 421 (e.g., "Visa®") that is included in the term hierarchy 401, as described with reference to FIGS. 4-5A.

The method 700 also includes determining that the training data indicates that the first input phrase is associated with a first user intent indicator, at 708. For example, the speech-to-text training data generator 108 of FIG. 1 determines that the IR training data 341 of FIG. 3 indicates that the input phrase 441 (e.g., "I want to pay my bill with a credit card") of FIG. 4 is associated with the user intent indicator 431 (e.g., a pay_bill indicator), as described with reference to FIGS. 4-5A.

The method 700 further includes determining that user interaction data indicates that a first proportion of user phrases received by the IR system from users correspond to the first user intent indicator, at 710. For example, the speech-to-text training data generator 108 of FIG. 1 generates the distribution data 329 of FIG. 3 based on the user interaction data 347 and determines that the distribution data 329 indicates that the proportion 461 (e.g., 25%) of user phrases received by the IR system 304 from users corresponds to the user intent indicator 431 of FIG. 4, as described with reference to FIGS. 4-5A.

The method 700 also includes updating the speech-to-text training data based on the first input phrase and the second phrase so that the first proportion of training phrases of the speech-to-text training data correspond to the first user intent indicator, at 712. For example, the speech-to-text training data generator 108 of FIG. 1 updates the speech-to-text training data 321 of FIG. 3 based on the input phrase 441 of FIG. 4 and the phrase 533 of FIG. 5 so that the proportion 461 (e.g., 25%) of training phrases of the speech-to-text training data 321 correspond to the user intent indicator 431 (e.g., a pay_bill indicator), as described with reference to FIGS. 4-5B. The speech-to-text model 361 is based on the speech-to-text training data 321.

The method 700 may thus enables automatically generating new phrases (e.g., the phrase 533) associated with the user intent indicator 431 and adding the new phrases to the speech-to-text training data 321. Training the speech-to-text model 361 based on the speech-to-text training data 321 enables the speech recognition system 306 to recognize the new phrases. The speech recognition system 306 trains the speech-to-text model 361 based on the speech-to-text training data 321. The speech-to-text training data 321 includes more phrases associated with a user intent indicator for which the IR system 304 receives more user phrases. Training the speech-to-text model 361 based on the speech-to-text training data 321 improves the likelihood of the speech recognition system 306 recognizing speech as matching user phrases that are more likely to be received by the speech recognition system 306.

Figure 8:
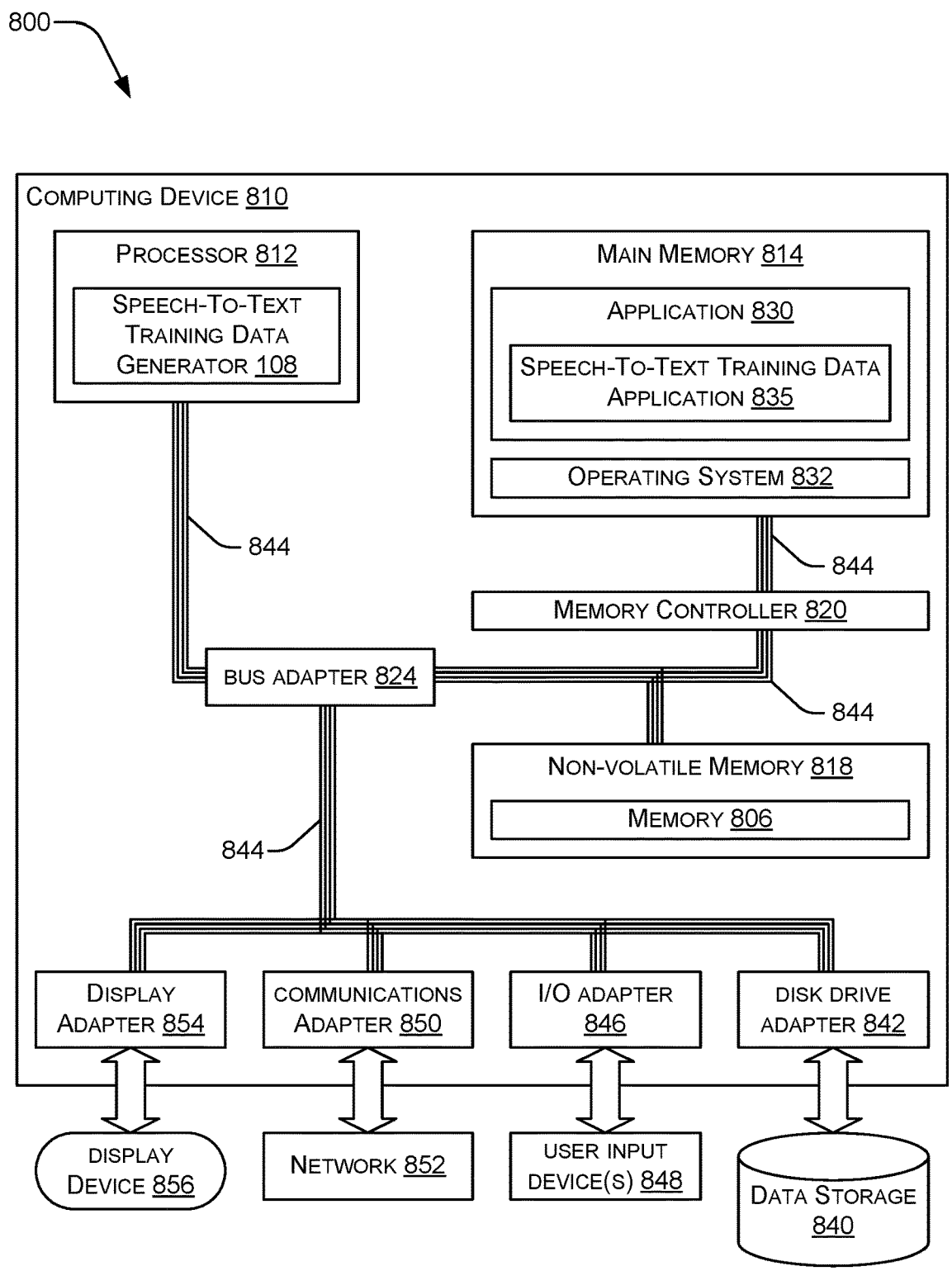
FIG. 8 illustrates a block diagram of a computing environment according to an aspect that includes electronic components through which the described speech-to-text training data generation may be implemented.

FIG. 8 is a block diagram 800 of a computing environment according to a first aspect that includes electronic components through which the described system may be implemented. The components in FIG. 8 support aspects of computer-implemented methods and computer-executable program instructions or code according to the present disclosure. For example, the computing device 810, or portions thereof, may execute instructions to generate speech-to-text training data such as described with respect to the speech-to-text training data generator 108 of FIG. 1.

In FIG. 8, the computing device 810 may include a processor 812, a main memory 814, an input/output (I/O) adapter 846, a non-volatile memory 818, a memory controller 820, a bus adapter 824, a display adapter 854, a communications adapter 850, and a disk drive adapter 842. The I/O adapter 846 may be configured to interface with one or more user input devices 848. For example, the I/O adapter 846 may communicate via serial interfaces (e.g., universal serial bus (USB) interfaces or Institute of Electrical and Electronics Engineers (IEEE) 1394 interfaces), parallel interfaces, display adapters, audio adapters, and other interfaces. The user input devices 848 may include keyboards, pointing devices, displays, speakers, microphones, touch screens, magnetic field generation devices, magnetic field detection devices, and other devices. The processor 812 may detect interaction events based on user input received via the I/O adapter 846. Additionally, the processor 812 may send a graphical user interface (GUI) and related elements to a display device via the I/O adapter 846.

The processor 812 may include the speech-to-text training data generator 108. The main memory 814 may include volatile memory devices (e.g., random access memory (RAM) devices), nonvolatile memory devices (e.g., read-only memory (ROM) devices, programmable read-only memory, and flash memory), or both. The main memory 814 of the computing device 810 includes software, such as an operating system 832 and software applications 830. The operating system 832 may include a basic/input output system for booting the computing device 810 as well as a full operating system to enable the computing device 810 to interact with users, other programs, and other devices. The software applications 830 may include a speech-to-text training data application 835. The speech-to-text training data application 835 may include, be included within, or correspond to the speech-to-text training data generator 108. The non-volatile memory 818 may include a memory 806. The memory 806 may correspond to the memory 320 of FIG. 3.

The display adapter 854 may be configured to interface with a display device 856. The communications adapter 850 may be configured to interface with the one or more networks 852. The disk drive adapter 842 may be configured to interface with one or more data storage devices 840. The data storage devices 840 may include nonvolatile storage devices, such as magnetic disks, optical disks, or flash memory devices. The data storage devices 840 may include both removable and non-removable memory devices. The data storage devices 840 may be configured to store an operating system, images of operating systems, applications, and program data. One or more buses 844 or other communication circuitry may enable the various components of the computing device 810 to communicate with one another.

The data storage device 840, the main memory 814, the non-volatile memory 818, the memory 806, or a combination thereof, may include computer-readable storage devices that store instructions executable by the processor 812 to cause the processor 812 to perform certain operations. For example, the operations may include accessing interactive response (IR) training data of an IR system, determining that a first input phrase includes a first term that is included in a term hierarchy, generating a second phrase by replacing the first term in the first input phrase with a second term included in the term hierarchy, determining that the IR training data indicates that the first input phrase is associated with a first user intent indicator, determining that user interaction data indicates that a first proportion of user phrases received by the IR system from users correspond to the first user intent indicator, and updating speech-to-text training data based on the first input phrase and the second phrase so that the first proportion of training phrases of the speech-to-text training data correspond to the first user intent indicator.

The present disclosure may include a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A device comprising:
a memory configured to store speech-to-text training data; and
a processor configured to:
access interactive response (IR) training data of an IR system, the IR training data associating input phrases supported by the IR system to user intent indicators;
in response to determining that a first input phrase of the input phrases includes a first term that is included in a term hierarchy, generate a second phrase by replacing the first term in the first input phrase with a second term included in the term hierarchy;
determine that the IR training data indicates that the first input phrase is associated with a first user intent indicator;
determine that user interaction data indicates that a first proportion of user phrases received by the IR system from users corresponds to the first user intent indicator; and
update the speech-to-text training data based on the first input phrase and the second phrase so that a second proportion of training phrases of the speech-to-text training data corresponds to the first user intent indicator, the second proportion based on the first proportion, wherein a speech-to-text model is trained based on the speech-to-text training data;
wherein a likelihood of the first input phrase being recognized as associated with the first user intent indicator increases, in response to a higher proportion of the speech-to-text training data being associated with the first user intent indicator;
a second proportion of the user phrases received by the IR system correspond to a second user intent indicator, or both the first user intent indicator and the second user intent indicator;
the speech recognition system trains the speech-to-text model based on the speech-to-text training data;
the speech-to-text training data includes more phrases associated with a first user intent indicator for which the IR system receives more user phrases, and thereby training the speech-to-text model based on the speech-to-text training data enables the speech recognition system to recognize new phrases.

2. The device of claim 1, wherein the user intent indicators include a financial transaction performance indicator, a human operator contact indicator, an information request indicator, or a combination thereof.

3. The device of claim 1, wherein the term hierarchy indicates that the first term is a parent of the second term.

4. The device of claim 1, further comprising an input interface configured to receive an input audio signal, wherein the processor is further configured to:

determine, based on the speech-to-text model, that the input audio signal matches the second phrase; and
in response to determining that the input audio signal matches the second phrase, generate an output indicating that the input audio signal matches the second phrase.

5. The device of claim 4, wherein the processor is further configured to process the first user intent indicator in response to determining that the input audio signal matches the second phrase.

6. The device of claim 1, wherein the processor is further configured to update the speech-to-text training data by adding multiple copies of the second phrase to the training phrases.

7. The device of claim 1, wherein the processor is further configured to update the speech-to-text training data by adding the first term to the training phrases.

8. The device of claim 1, wherein the processor is further configured to update the speech-to-text training data by adding the second term to the training phrases.

9. The device of claim 1, wherein the processor is configured to update the speech-to-text model based on the speech-to-text training data.

10. The device of claim 1, further comprising an interface configured to provide, to a second device, the speech-to-text training data to initiate an update of the speech-to-text model.

11. A method comprising:
accessing, at a device, interactive response (IR) training data of an IR system, the IR training data associating input phrases supported by the IR system to user intent indicators;
determining, at the device, that a first input phrase of the input phrases includes a first term that is included in a term hierarchy;
in response to determining that the first input phrase includes the first term, generating a second phrase by replacing the first term in the first input phrase with a second term included in the term hierarchy;
determining, at the device, that the IR training data indicates that the first input phrase is associated with a first user intent indicator;
determining, at the device, that user interaction data indicates that a first proportion of user phrases received by the IR system from users corresponds to the first user intent indicator; and
updating, at the device, speech-to-text training data based on the first input phrase and the second phrase so that a second proportion of training phrases of the speech-to-text training data corresponds to the first user intent indicator, the second proportion based on the first proportion, wherein a speech-to-text model is trained based on the speech-to-text training data;
wherein a likelihood of the first input phrase being recognized as associated with the first user intent indicator increases, in response to a higher proportion of the speech-to-text training data being associated with the first user intent indicator;
a second proportion of the user phrases received by the IR system correspond to a second user intent indicator, or both the first user intent indicator and the second user intent indicator;
the speech recognition system trains the speech-to-text model based on the speech-to-text training data;
the speech-to-text training data includes more phrases associated with a first user intent indicator for which the IR system receives more user phrases, and thereby training the speech-to-text model based on the speech-to-text training data enables the speech recognition system to recognize new phrases.

12. The method of claim 11, further comprising:
receiving an input audio signal at the device;
determining, based on the speech-to-text model, that the input audio signal matches the second phrase; and
in response to determining that the input audio signal matches the second phrase, processing the first user intent indicator.

13. The method of claim 12, further comprising determining that the first user intent indicator includes a financial transaction performance indicator, wherein processing the first user intent indicator includes initiating a financial transaction.

14. The method of claim 12, further comprising determining that the first user intent indicator includes a human operator contact indicator, wherein processing the first user intent indicator includes initiating contact with a human operator.

15. The method of claim 12, further comprising determining that the first user intent indicator includes an information request indicator, wherein processing the first user intent indicator includes providing information.

16. The method of claim 11, wherein the second term is a parent of the first term in the term hierarchy.

17. The method of claim 11, further comprising updating the speech-to-text training data by adding multiple copies of the first input phrase to the training phrases.

18. The method of claim 11, further comprising updating the speech-to-text training data by adding multiple copies of the second phrase to the training phrases.

19. A computer program product comprising a computer readable storage medium having program instructions embodied therewith, the program instructions executable by a processor to cause the processor to perform operations comprising:
accessing interactive response (IR) training data of an IR system, the IR training data associating input phrases supported by the IR system to user intent indicators;
determining that a first input phrase of the input phrases includes a first term that is included in a term hierarchy;
in response to determining that the first input phrase includes the first term, generating a second phrase by replacing the first term in the first input phrase with a second term included in the term hierarchy;
determining that the IR training data indicates that the first input phrase is associated with a first user intent indicator;
determining that user interaction data indicates that a first proportion of user phrases received by the IR system from users corresponds to the first user intent indicator; and
updating speech-to-text training data based on the first input phrase and the second phrase so that a second proportion of training phrases of the speech-to-text training data corresponds to the first user intent indicator, the second proportion based on the first proportion, wherein a speech-to-text model is based on the speech-to-text training data;
wherein a likelihood of the first input phrase being recognized as associated with the first user intent indicator increases, in response to a higher proportion of the speech-to-text training data being associated with the first user intent indicator;
a second proportion of the user phrases received by the IR system correspond to a second user intent indicator, or both the first user intent indicator and the second user intent indicator;
the speech recognition system trains the speech-to-text model based on the speech-to-text training data;
the speech-to-text training data includes more phrases associated with a first user intent indicator for which the IR system receives more user phrases, and thereby training the speech-to-text model based on the speech-to-text training data enables the speech recognition system to recognize new phrases.

20. The computer program product of claim 19, wherein the operations further comprise updating the speech-to-text training data by adding multiple copies of the second phrase to the training phrases.

* * * * *